United States Patent
Felicijan

(10) Patent No.: US 9,645,793 B2
(45) Date of Patent: May 9, 2017

(54) RANDOM PERMUTATION GENERATOR AND METHOD FOR GENERATING A RANDOM PERMUTATION SEQUENCE

(71) Applicant: Infineon Technologies AG, Neubiberg (DE)

(72) Inventor: Tomaz Felicijan, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 458 days.

(21) Appl. No.: 14/097,346

(22) Filed: Dec. 5, 2013

(65) Prior Publication Data

US 2015/0160923 A1 Jun. 11, 2015

(51) Int. Cl.
 *G06F 7/58* (2006.01)
 *G06F 7/76* (2006.01)
(52) U.S. Cl.
 CPC .................. *G06F 7/58* (2013.01); *G06F 7/76* (2013.01); *G06F 2207/58* (2013.01)
(58) Field of Classification Search
 CPC ............................................. G06F 7/58–7/785
 USPC .................................................. 708/250–254
 See application file for complete search history.

(56) References Cited

U.S. PATENT DOCUMENTS

| 5,930,291 A * | 7/1999 | Hines | G06F 7/582 331/78 |
|---|---|---|---|
| 6,725,374 B1 * | 4/2004 | Jahnich | G06F 21/72 380/205 |
| 6,934,388 B1 * | 8/2005 | Clark | G06F 7/76 375/E1.035 |
| 6,986,054 B2 * | 1/2006 | Kaminaga | G06F 7/723 380/277 |
| 7,853,633 B2 * | 12/2010 | Poole | H04L 9/34 708/250 |
| 8,370,412 B2 * | 2/2013 | Schumacher | G06F 7/58 708/250 |
| 2006/0004899 A1 * | 1/2006 | Tan | G11B 27/105 708/250 |
| 2006/0123309 A1 * | 6/2006 | Dinoi | H03M 13/2746 714/746 |
| 2010/0169400 A1 * | 7/2010 | Yang | G06F 7/76 708/250 |

* cited by examiner

*Primary Examiner* — Matthew Sandifer
(74) *Attorney, Agent, or Firm* — Viering, Jentschura & Partner mbB

(57) ABSTRACT

According to one embodiment, a permutation generator is described comprising a memory configured to store, for each number of a predetermined set of numbers, whether the number has already been included in a number sequence; a receiver configured to receive a random number; a determiner configured to select a number from those numbers of the set of numbers that have not yet been included in the number sequence as next element of the number sequence based on the random number and an output configured to output the selected number as the next element of the number sequence.

11 Claims, 4 Drawing Sheets

RANDOM PERMUTATION GENERATOR AND METHOD FOR GENERATING A RANDOM PERMUTATION SEQUENCE

TECHNICAL FIELD

The present disclosure relates to permutation generators and methods for generating a permutation sequence.

BACKGROUND

For various applications, random non-repeating sequences of N (N being an integer) numbers are needed, for example to randomize the time of the execution of security relevant operations, for example on a chip card. Generators for generating such non-repeating sequences (in other words permutations) which have low complexity and which provide the numbers of the sequence deterministically in terms of time (i.e. at predetermined times) are desirable.

SUMMARY

According to one embodiment, a permutation generator is provided including a memory configured to store, for each number of a predetermined set of numbers, whether the number has already been included in a number sequence; a receiver configured to receive a random number; a determiner configured to select a number from those numbers of the set of numbers that have not yet been included in the number sequence as next element of the number sequence based on the random number and an output configured to output the selected number as the next element of the number sequence.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
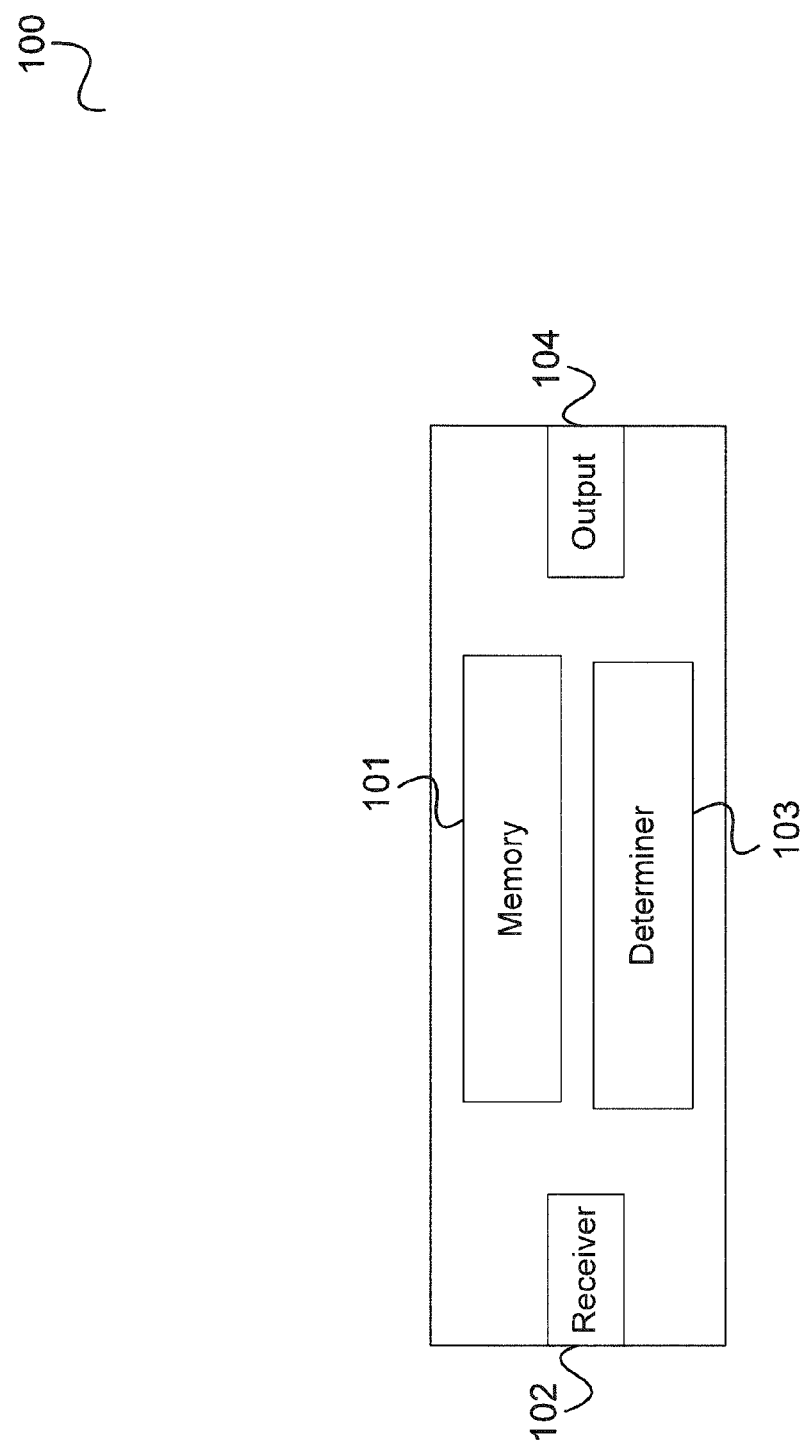
FIG. 1 shows a permutation generator according to an embodiment.

FIG. 1 shows a permutation generator 100 according to an embodiment.

The permutation generator 100 includes a memory 101 configured to store, for each number of a predetermined set of numbers, whether the number has already been included in a number sequence.

The permutation generator 100 further includes a receiver 102 configured to receive a random number.

Further, the permutation generator 100 includes a determiner 103 configured to select a number from those numbers of the set of numbers that have not yet been included in the number sequence as next element of the number sequence based on the random number and an output 104 configured to output the selected number as the next element of the number sequence.

In other words, each number of a permutation sequence is randomly selected (namely based on an input random number) from a number set wherein the number is taken from the remaining numbers of the set, i.e. those which have not yet occurred in the permutation sequence. It should be noted that if all numbers have been used, i.e. a permutation sequence having all the numbers in the set has been generated, the generation of a permutation sequence may be restarted, i.e. all numbers of the set are again marked as unused and the first number of the next permutation sequence is again selected from all numbers of the set.

According to one embodiment, the determiner is configured to determine one or more candidate numbers, check whether the one or more candidate numbers include a number that has not yet been included in the number sequence and, if the one or more candidate numbers do not include a number that has not yet been included in the number sequence select a number from among the plurality of number other than the one or more candidate numbers.

According to one embodiment, the determiner is configured to perform a search based on the random number among those numbers of the set of numbers that have not yet been included in the number sequence for a number to be selected as next element of the number sequence.

The search is for example a tree search wherein each number of the plurality of numbers corresponds to one leaf. In other words, a tree search is carried out (starting from the root of the tree) and the leaf that is reached in the tree search is selected as the next element of the number sequence.

For example, the search is a binary tree search.

The determiner may for example be configured to select, at each node of the tree, a sub-tree where it continues the search based on a bit of a bit representation of the random number.

For example, the determiner is configured to select, at each node of the tree, a sub-tree where it continues the search depending on whether the sub-tree includes at least one leaf corresponding to a number that has not yet been included in the number sequence. In other words, a sub-tree is only selected if it includes at least one leaf corresponding to a number that has not yet been included in the number sequence.

According to one embodiment, the determiner is configured to select a number from those numbers of the set of numbers that have not yet been included in the number sequence as next element of the number sequence based on the random number for each of a plurality of time intervals and the output is configured to output the selected number as the next element of the number sequence for the time interval.

For example, the permutation generator generates and outputs numbers at predetermined times, i.e. deterministically in terms of time. It may be thus avoided that a component provided with the permutation number sequence has to wait for an unknown time for the next sequence element, as it would be for example the case if the permutation sequence was generated by waiting for a number provided by a random number generator that has not been used yet.

The random number is for example a random number of a sequence of random numbers (e.g. provided by a random number generator) and the determiner is for example configured to select the number based on the random number and independent from the other random numbers of the sequence of random numbers.

For example, the sequence of random numbers has as many elements as the number sequence.

According to one embodiment, the memory is a register including a bit for each number of the predetermined set of numbers, wherein the bit indicates whether the number has already been included in the number sequence.

According to one embodiment, the predetermined set of numbers is a set of numbers available for the number sequence.

In other words, the predetermined numbers are those numbers which are available for the number sequence at the start of the generation of the number sequence. Further numbers may be masked (made unavailable) for example by marking them as already used for the number sequence even if they have not been used for the number sequence.

Figure 2:
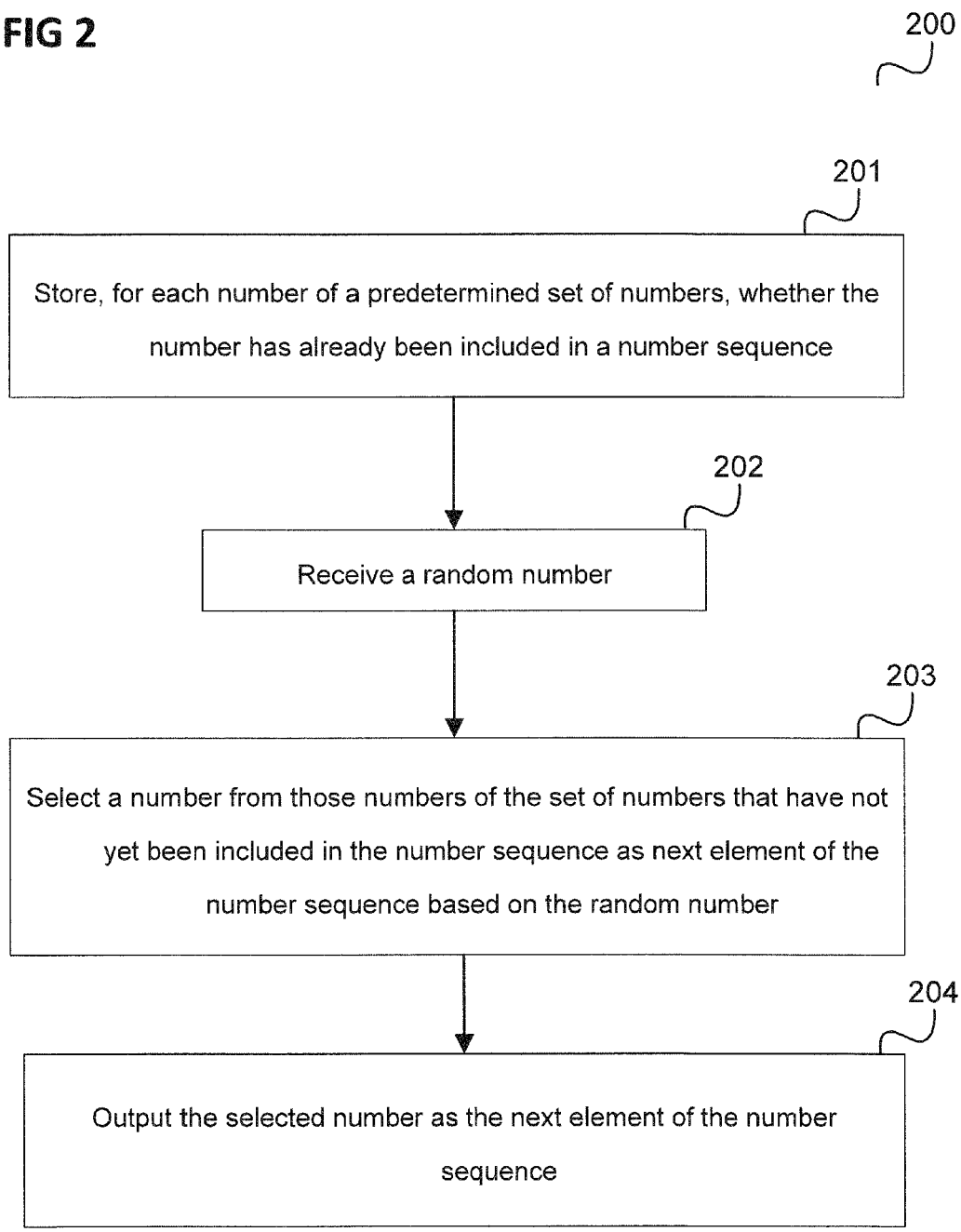
FIG. 2 shows a flow diagram according to an embodiment.

The permutation generator 100 may for example carry out a method as illustrated in FIG. 2.

FIG. 2 shows a flow diagram 200 according to an embodiment.

The flow diagram 200 illustrates a method for generating a permutation sequence.

In 201, it is stored for each number of a predetermined set of numbers whether the number has already been included in a number sequence.

In 202, a random number is received.

In 203, a number from those numbers of the set of numbers that have not yet been included in the number sequence is selected as next element of the number sequence based on the random number.

In 204, the selected number is output as the next element of the number sequence.

It should be noted that embodiments described in context with the permutation generator 100 are analogously valid for the method illustrated in FIG. 2 and vice versa.

The permutation generator 100 may be implemented with low complexity and such that it provides the numbers of the sequence deterministically in terms of time (i.e. at predetermined times). In the following, embodiments are described in more detail.

Figure 3:
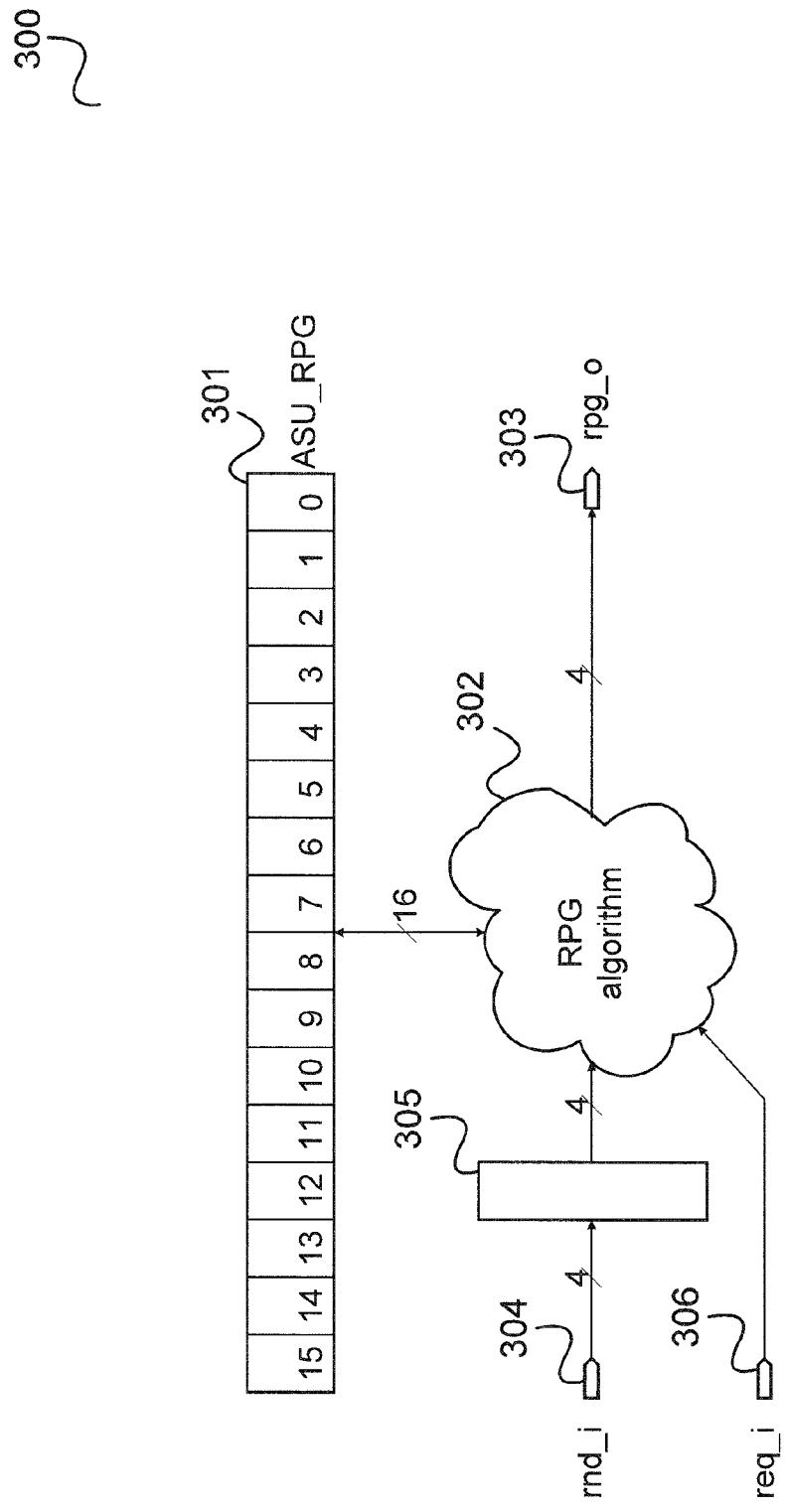
FIG. 3 shows an example for a permutation generator to generate permutations of 16 values according to an embodiment.

FIG. 3 shows an example for a permutation generator 300 to generate permutations of 16 values (at maximum) according to an embodiment.

The permutation sequence that is generated is represented as a sequence of 4-bit symbols. It should be noted that the permutation generator 300 can be easily extended to generate a permutation sequence of $2^n$-bit numbers (with n being an integer). Similarly, the permutation generator 300 may be easily extended to generate permutation sequences with more than 16 numbers.

The permutation generator 300 is for example configured to generate a sequence of permutation sequences, i.e. to generate a new permutation sequence when a permutation sequence has been finished.

The permutation generator 300 includes a 16-bit validity register 301 which keeps track of which numbers of the set of numbers to be used for the permutation sequence (including numbers 0-15) have already been used in the current permutation sequence. For example, for each number from 0 to 15 a corresponding bit value of 0 indicates that the number is still available for the current permutation sequence and a corresponding bit value of 1 indicates that the number is no longer available for the current permutation sequence.

The permutation generator 300 further includes a processing element 302 which is configured to carry out a random permutation generator (RPG) algorithm and which generates the permutation sequence and provides it at an output 303.

The permutation generator 300 receives, via a random number input 304, a random number which it stores in a buffer 305. The random number is for example provided by a random number generator and is in this example also a number between 0 and 15 in a 4-bit representation. According to one example, the permutation generator 300 receives a random number for each number of the permutation sequence, i.e. the processing element generates each number of the permutation sequence based on a different random number (being currently stored in buffer 305).

The permutation generator 300 further includes a control input 306 via which it receives a request signal which triggers the generation of the next element of the permutation sequence.

Before the generation of a permutation sequence is started (e.g. after the generation of a preceding permutation sequence has been completed) the validity register 301 is initialized, for example by writing a string of 16 zeroes (i.e. a binary zero in 16-bit representation).

It should be noted that the validity register 301 may also be initialized to a non-zero value such that not all the numbers from 0 to 15 are made available for the permutation sequence. For example, if the validity register 301 is initialized with the value 0x000F the processing element 302 only uses the values 4 to 15 for the permutation sequence.

In the following, an example is described in which the processing element 302 generates the permutation sequence using a binary tree search algorithm as RPG algorithm.

Figure 4:
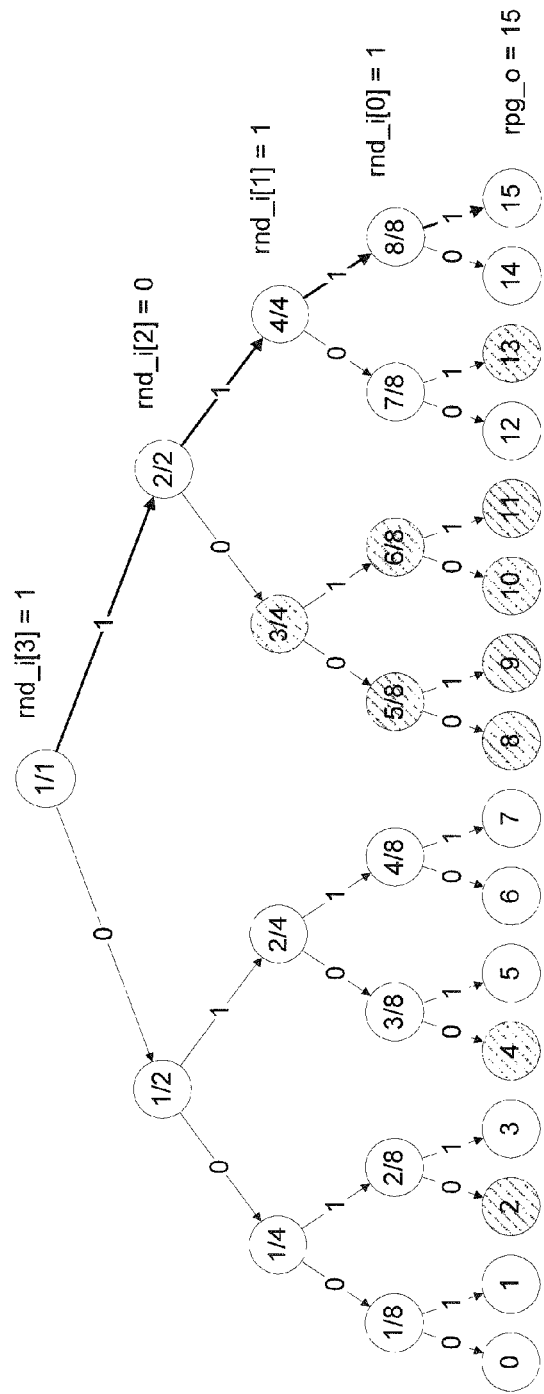
FIG. 4 shows a binary search tree.

FIG. 4 shows a binary search tree 400.

At the bottom level the binary search tree 400 includes 16 leaf nodes (labeled 0 to 16) wherein each leaf node represents a number of the set to be used for the permutation sequence. A hatched leaf node indicates that the corresponding number is no longer available for the permutation sequence. As can be seen, nodes at higher levels of the binary search tree are also marked as unavailable (hatched) if all leaves below that node are marked as unavailable.

A current number of the permutation sequence is selected based on a 4-bit representation rnd_i[0] to rnd_i[3] of the random number currently stored in buffer 305. Namely, for selecting the current number, starting from the root node, at each node, a sub-tree (left or right) is selected based on one bit of the random number (in this example based on md_i[3] at the root node, md_i[2] at the level below the root node and so on). The leaf node that is reached in this way gives the current number of the permutation sequence. Thus, the current number of the permutation sequence is selected randomly.

If at a node, according to the bit of the random number specifies a sub-tree (or leaf) that does not have any leaf nodes available, the opposite sub-tree is chosen. In the following, an example is given in which it is assumed that the numbers 2, 4, 8, 9, 10, 11, 13 are no longer available for the current permutation sequence (as illustrated in FIG. 4 by the hatching) and that the random number currently stored in buffer 305 is 1011 in binary representation.

The execution starts at the root node labeled 1/1. At the root node, the bit rnd_i[3] specifies that the right sub-tree starting at the node labeled 2/2 is to be selected. At this node, the bit rnd_i[2] specifies that the left sub-tree is to be selected starting at the node labeled 3/4. However, since there are no leaf nodes available in the corresponding sub-tree the algorithm switches to the right sub-tree starting at the node labeled 4/4. The process continues analogously and reaches the node labeled 8/8 and then the leaf node corresponding to the number 15 which is output as the next number of the permutation sequence via output 303 and which is marked as unavailable for the determination of the following number of the permutation sequence.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A permutation generator circuit comprising
    a memory configured to store, for each number of a predetermined set of numbers, whether the number has already been included in a number sequence;
    a receiver configured to receive a random number;
    a determiner configured to select a number from those numbers of the set of numbers that have not yet been included in the number sequence as next element of the number sequence based on the random number; wherein the determiner is configured to perform a tree search based on the random number; wherein the determiner is configured to select, at each node of the tree, a sub-tree where it continues the search based on a bit of a bit representation of the random number; and
    an output configured to output the selected number as the next element of the number sequence; and
    wherein a time of an execution of at least one security relevant operation on a chip card is randomized based on the number sequence.

2. The permutation generator of claim 1, wherein the determiner is configured to determine one or more candidate numbers, check whether the one or more candidate numbers include a number that has not yet been included in the number sequence and, if the one or more candidate numbers do not include a number that has not yet been included in the number sequence select a number from among the plurality of number other than the one or more candidate numbers.

3. The permutation generator of claim 1, wherein each number of the plurality of numbers corresponds to one leaf of the tree search.

4. The permutation generator of claim 3, wherein the search is a binary tree search.

5. The permutation generator of claim 1, wherein the determiner is configured to select, at each node of the tree, a sub-tree where it continues the search depending on whether the sub-tree includes at least one leaf corresponding to a number that has not yet been included in the number sequence.

6. The permutation generator of claim 1, wherein the determiner is configured to select a number from those numbers of the set of numbers that have not yet been included in the number sequence as next element of the number sequence based on the random number for each of a plurality of time intervals and the output is configured to output the selected number as the next element of the number sequence for the time interval.

7. The permutation generator of claim 1, wherein the random number is a random number of a sequence of random numbers and the determiner is configured to select the number based on the random number and independent from the other random numbers of the sequence of random numbers.

8. The permutation generator of claim 7, wherein the sequence of random numbers has as many elements as the number sequence.

9. The permutation generator of claim 1, wherein the memory is a register comprising a bit for each number of the predetermined set of numbers, wherein the bit indicates whether the number has already been included in the number sequence.

10. The permutation generator of claim 1, wherein the predetermined set of numbers is a set of numbers available for the number sequence.

11. A method for generating a permutation sequence comprising storing, for each number of a predetermined set of numbers, whether the number has already been included in a number sequence;
    receiving a random number;
    selecting a number from those numbers of the set of numbers that have not yet been included in the number sequence as next element of the number sequence based on the random number;
    performing a tree search based on the random number;
    selecting, at each node of the tree, a sub-tree where it continues the search based on a bit of a bit representation of the random number; and
    outputting the selected number as the next element of the number sequence; and
    using the number sequence to randomize a time of an execution of at least one security operation on a chip card.

* * * * *